United States Patent [19]
Schlittler

[11] 3,910,019
[45] Oct. 7, 1975

[54] HAY-MAKING MACHINE
[76] Inventor: Jacques Roby Schlittler, Post Clugin, CH-7421 Andeer, Switzerland
[22] Filed: Aug. 20, 1974
[21] Appl. No.: 499,080

Related U.S. Application Data
[63] Continuation-in-part of Ser. No. 351,186, April 16, 1973, abandoned.

[52] U.S. Cl. ................................... 56/367; 56/370
[51] Int. Cl.² ........................................ A01D 81/00
[58] Field of Search ............ 56/370, 365, 366, 367, 56/377

[56] References Cited
UNITED STATES PATENTS
| | | | |
|---|---|---|---|
| 3,267,656 | 8/1966 | van der Lely | 56/370 |
| 3,522,860 | 8/1970 | Purrer et al. | 56/370 X |
| 3,645,077 | 2/1972 | Hauser-Lienhard | 56/366 |
| 3,664,105 | 5/1972 | Stiefrater et al. | 56/370 |

FOREIGN PATENTS OR APPLICATIONS
| | | | |
|---|---|---|---|
| 80,922 | 5/1963 | France | 56/370 |
| 1,376,142 | 9/1964 | France | 56/370 |
| 1,482,164 | 2/1964 | Germany | 56/370 |

Primary Examiner—Russell R. Kinsey
Attorney, Agent, or Firm—Woodhams, Blanchard and Flynn

[57] ABSTRACT
A hay-making machine having rotary rakes supported on a frame for rotation about a generally vertical axis. The frame has a main support frame in the form of an equilateral triangle with the base of the triangle lying transverse to the directon of travel of the machine and the apex points in the direction of travel. A main gearbox is provided which is driven by the power take off from a tractor. A three point attachment member is utilized for attaching the machine to the tractor at a point adjacent the apex of the aforementioned triangle. A support bearing is provided having generally a vertical bearing axis and is arranged at the base angles of the triangle and in each support bearing one auxiliary frame is provided for supporting a group of rotary rakes which are articulated so as to be pivotable and lockable in position with respect to the main frame.

18 Claims, 12 Drawing Figures

HAY-MAKING MACHINE

This application is a continuation-in-part of application Ser. No. 351,186, filed Apr. 16, 1973 and now abandoned.

This invention relates to a hay-making machine comprising rotary rakes secured to a frame of the machine, supported on the ground so as to be transportable and drivingly rotated about approximately vertical axes of rotation.

Previously known hay-making machines having a large working width suffer from the disadvantage that they can only be used for a few hay-making operations or that they have resetting devices on the support frames or machine frames thereof which are unmanageable or difficult to operate.

The aim of the invention is to provide a hay-making machine having a large working width which has a simple and lucid frame construction and which can be reset easily and with only little manipulation from one working position to another or into transport position.

In accordance with the invention, this is achieved in that the machine frame has a main support frame with substantially the shape of an equilateral triangle with the base lying transverse to the direction of travel of the machine and the apex pointing in the direction of travel when seen in plan elevation, a main gearbox which can be driven by the tractor and the linking device for attaching the machine to the tractor being arranged adjacent the apex of this triangle and a support bearing with an approximately vertical bearing axis being arranged at the base angles of the triangle and in each support bearing one auxiliary frame supporting a group of rotary rakes being articulated so as to be pivotable and lockable in position with respect to the main support frame.

By virtue of the fact that the hay-making machine in accordance with the invention has a main support frame and two auxiliary frames supporting a group of rotary rakes respectively, a clearer frame construction is provided in which the resetting in the different working positions can be executed rapidly and without difficulties due to the simple and lucid construction of the entire support frame.

In accordance with another feature of the invention, it is provided that the forks of the rotary rakes be secured to the outer ends of arms which can be controllably pivoted in an arbitrary manner about their longitudinal axes by means of a control gearing during the rotation of the rotary rakes or can be disengaged from said control gearing and locked on the bogie of the rotary rakes.

This re-settability of the fork support arms, which is known per se, permits an especially versatile application or useability of the hay-making machine in accordance with the invention, i.e. a greater number of various work operations can be executed. Of course, the frame construction according to the invention can also be used in hay-making machines which do have any control gearboxes for fork control.

In another embodiment of the invention, it is provided that each auxiliary frame comprises a common support bearing the rotary rakes and an arm protruding therefrom, said arm being articulated on the support bearing of the main support frame.

In another embodiment of the auxiliary frame as is provided in another development of the invention, it is easily possible to journal the support so as to be pivotable and lockable about a pivoting axle lying, with respect to the arm, approximately parallel to the longitudinal axis thereof. The axes of rotation of the rotary rakes can thereby be brought into a forwardly inclined position which is necessary for certain operations, this re-adjustment being carried out in a simple manner by means of an adjustment crank disposed between the support and the support pivot.

The groups of rotary rakes are caused to be adapted to the level of the ground in accordance with another feature of the invention, namely in that the arm is composed of two parts which are articulately interconnected in a joint with an articulated axle which lies approximately parallel to the ground and at right angles to the support. The arrangement of this pivot bearing permits at least limited pivotability of the frames supporting the groups of rotary rakes with respect to the main support frame and thus achieves a good ground holding capacity of the rotary rakes.

Versatile application of the machine, i.e. both a greater number of different working operations as well as a very expedient position for transport, can be achieved in that the groups of rotary rakes can be brought into at least two different working positions as well as into a transport position by pivoting them about the support bearings and can be locked into these positions with respect to the main support frame. This simple re-setting of the hay-making machine by pivoting the groups of rotary rakes about the bearing axes of the support bearings can be carried out in a relatively short time and permits a plurality of different working operations in conjunction with either controlled or non-controlled forks. A favorable position for transport can also be attained by pivoting the groups of rotary rakes about the support bearings.

A machine with a particularly large working width is attained in that three respective rotary rakes are provided on each group of rotary rakes.

A raking together of two swaths lying in spaced relation to one another is possible with this machine in that the distance between the outer rotary rake(s) and the inner rotary rake (s) can be set by pivoting the outer rotary rake(s) outwardly with respect to the inner rotary rake(s) to a distance corresponding to a swath width.

When the machine is in this position, two separate swaths can be formed which can then be picked up by a subsequent loading machine, in particular in the case of very thick swath material.

The formation of smaller night or drying swaths is possible according to a further feature of the invention in that the distances between the two inner rotary rakes as well as between the outer rotary rakes and the center rotary rakes can be set at a distance corresponding to a swath width. These small swaths can be easily spread out during subsequent working operations or can be raked together to form a single loading swath.

A hay-making machine which is clear and easily operatable is achieved in accordance with a further feature, namely in that one pair of rotary rakes is provided at each group of rotary rakes. This machine with two pairs of rotary rakes can be converted easily from one operation to another and setting up the transport position is also rapidly possible without difficulties, since the pairs of rotary rakes need only be pivoted about the support bearings.

If only one swath is to be raked together with the machine, then this is possible in that two groups of rotary rakes can be brought into such a working position by pivoting the support crossbar thereof about the support bearings provided on the main support frame that, when seen in plane elevation, straight lines respectively drawn through the longitudinal axes of the supports supporting the groups of rotary rakes from an angle which points in a direction opposite the direction of travel of the machine and whose apex lies along the plane of symmetry extending in the direction of travel and the inner rotary rakes have a greater spacing from one another than the rotary rakes of the groups of rotary rakes.

In another development of the invention, it is provided that the two groups of rotary rakes can be brought from the working positions thereof into a transport position by pivoting the support crossbars thereof about the support bearings provided on the main support frame in which the inner rotary rakes are in direct proximity as seen in plane elevation and lie in the area in front of the outer rotary rakes which are also disposed in direct proximity.

When setting the transport position, it is advantageous if the circles drawn through the tips of the forks of the proximate rotary rakes overlap one another in part in the transport position. The machine can be easily adjusted to the width permissible for travel on public roads due to this partial overlapping of the circles drawn by the tips of the forks of the proximate rotary rakes. Any unevenness in the ground which is present can be well compensated for by the groups of rotary rakes in transport position by means of the pivot bearings which are disposed between the support pivots and the support crossbars and which extend transverse to the direction of travel of the machine.

Due to the considerable weight of the hay-making machine, it is also advantageous if the machine is supported both in the working as well as in the transport position by the wheels, the main support frame, in the lowered working position of the machine, being journaled on a three-point attachment block attachable to a tractor and laterally pivotable about a pivot pin having an approximately vertical pivoting axis. The machine is only lifted when the tractor is stationary if it is necessary to reset the machine from one working position into another working position or into the transport position The main support frame is secured in this position against pivoting with reference to the tractor.

In the case of a laterally pivotable arrangement of the main support frame relative to the tractor, another embodiment of the invention provides that two wheels, which have wheel axes which are interaligned in every pivoting position of the machine, can be pivoted about approximately vertical axes and locked in running positions corresponding to the respective pivoting positions of the groups of rotary rakes. The machine can then follow behind the tractor like a drawn machine.

It is possible to easily reset or adjust the wheels which determine the direction of travel of the machine in that adjustment means, which are arranged above the rotary rakes and which pass through the axes of rotation of the rotary rakes, are provided for setting the direction of running of the wheels.

It is also possible in principle to arrange the hay-making machine behind the tractor so that it does not swing laterally; the wheels supporting the machine, however, have to have positive caster in this case, thereby causing them to be adapted to the respective directions of movement of the machine.

The invention will now be more fully explained and illustrated hereinafter with reference to an embodiment shown in the drawing, in which:

FIG. 5 is a schematic, fragmentary side view of the three-point attachment block according to FIG. 1, FIG. 6 schematically illustrates the inclination adjusting mechanism of the machine in a partial cross-sectional view substantially taken on the line 6—6 of FIG. 1, FIG. 7 is a cross-sectional view of a gearing for the reversal of the direction of rotation of the central rotary rakes, which gearing is indicated in a top view of FIG. 1.

FIG. 8 is a schematic plan view of the position of the rotary rakes in the machine in accordance with FIG. 1, the outer rotary rakes and the inner rotary rakes proximate thereto being spaced at a distance corresponding to the width of a swath.

Figures 1, 2:
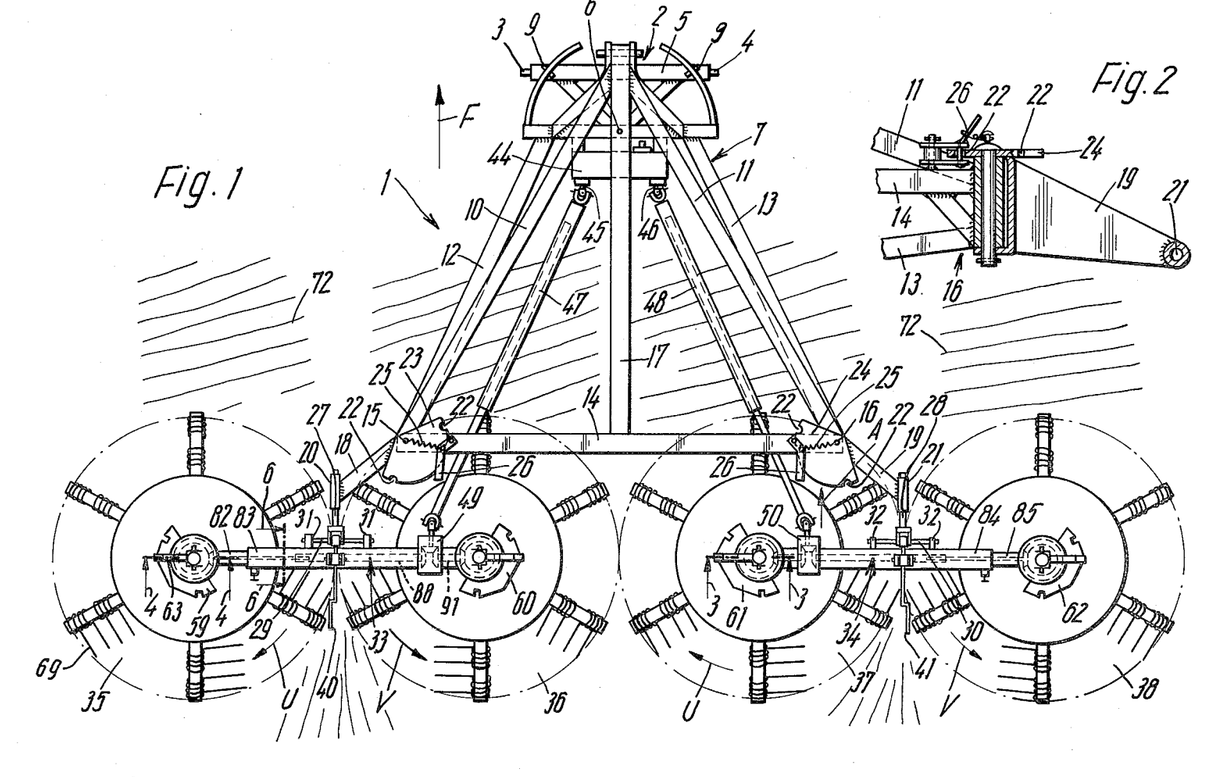
FIG. 1 is a schematic plan view of a hay-making machine comprising four rotary hay rakes in normal position in which the axes of rotation lie in a plane extending transversely to the direction of travel of the machine.
FIG. 2 is a fragmentary elevational view of a bearing support taken in direction of the arrow A according to FIG. 1, FIG. 3 schematically illustrates a rotary rake of the machine in a cross-sectional view substantially as taken on the line 3—3 of FIG. 1, FIG. 4 schematically illustrates the drive and adjusting mechanism for the rotary rake in a fragmentary cross-sectional view substantially as taken on the line 4—4 of FIG. 1.
Figures 5, 6, 7, 8:
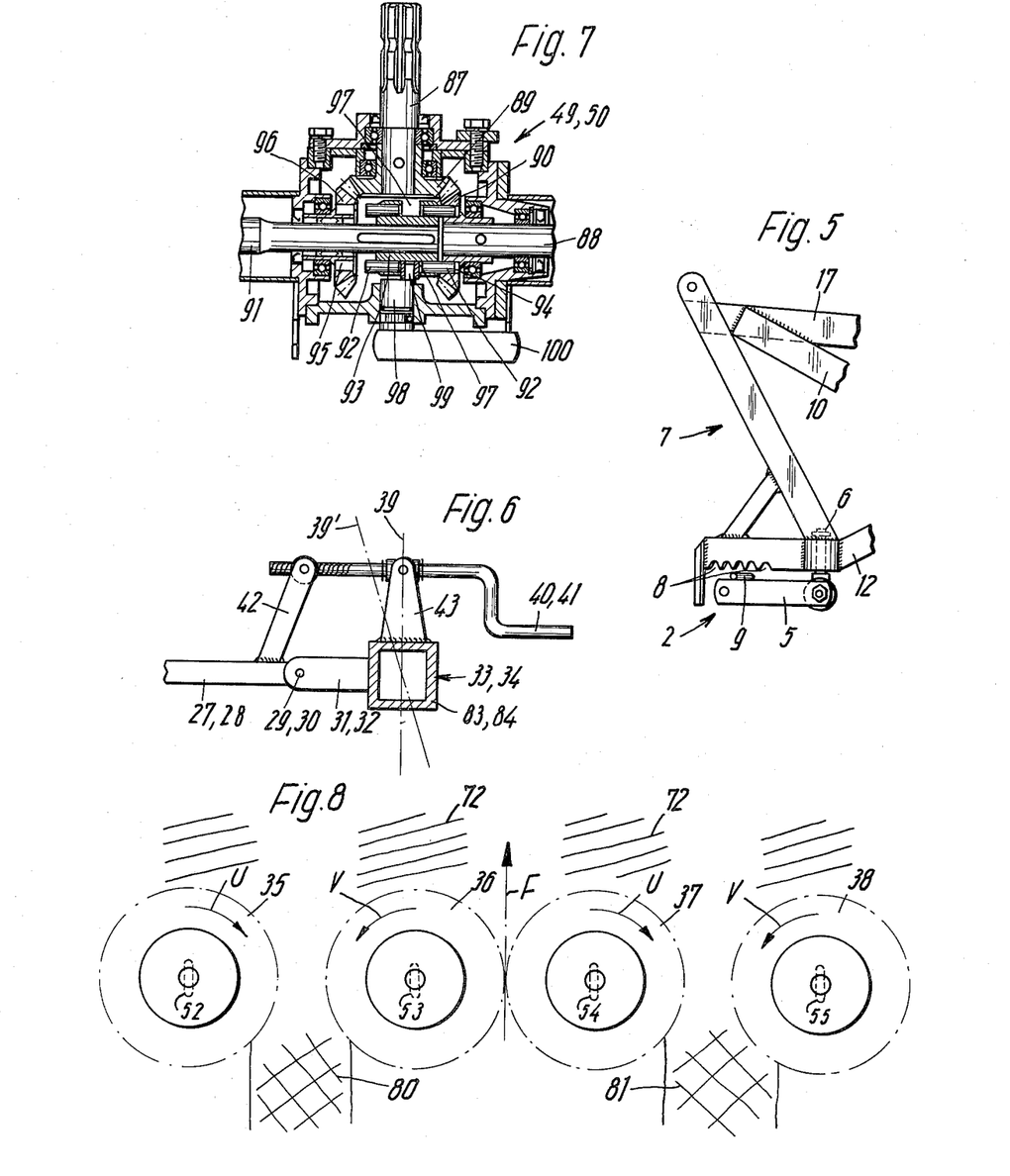

As is shown in FIGS. 1, 2 and 5, the hay-making machine 1 can be attached by means of a three-point attachment trestle, or block, 2 to the three-point coupling device of the tractor not shown in the drawing. The crossarm 5 of the three-point attachment trestle 2 supporting the lower pivots 3, 4 has, as it is especially shown in FIG. 5, at its rear end a pivot pin 6 with an approximately vertical pivot axis on which the main support frame 7 of the machine is rotatably journaled and laterally pivoted. This lateral pivotability of the main support frame 7 and thus of the entire machine with respect to the three-point attachment, or linking device 2, is, however, blocked during lifting of the machine through upward swinging of the crossarm 5 by means of the conventional tractor hydraulic system (not shown) of the tractor. Thus, when the crossarm 5 is raised, locking notches 8 provided on the three-point attachment block 2 engage locking pins 9 provided on the crossarm 5, so that no lateral pivoting movement of the main support frame 7 can occur.

The main support frame 7 of the machine comprises substantially two upper support arms 10 and 11 and two lower support arms 12 and 13 which extend obliquely to the rear (opposite to the intended direction of travel) and which are connected to the rigid base support 14 and a middle support arm 17. As it is especially shown in FIG. 2, a support bearing 15 or 16 with an approximately vertical bearing axis is respectively arranged at the two base corner points of the main support frame 7.

One support crossbar 18 or 19 is rotatably journaled in the support bearings 15 or 16 of the main support frame 7 and can be fixed in at least three positions with respect to the main support frame 7. The support crossbar has at its free end a pivot bearing 20 or 21 with a pivoting axis which lies in the direction of travel F of the machine and is approximately parallel to the ground. In order to establish the position of the support crossbar 18 or 19 with respect to the main support frame 7, lock segments 23 and 24 are secured on the journaled ends of the respective support crossbars 18 and 19. Each lock segment 23 or 24 has locking notches 22 and can be fixed in position upon engagement thereof by a binder pin 26, which is supported pivotably on the base support 14 and is urged toward the lock segment the force of a spring 25 (FIG. 1), so that the support crossbars 18 and 19 can be fixed in a normal working position (FIG. 1), a swath position (FIG. 9) and a transport position (FIG. 10) with reference to the main support frame 7. Support members or pivots 27 and 28 are rotatably journaled in the pivot bearings 20, 21 which are secured to the support crossbars 18 and 19. These support pivots each carry at their rear ends a respective support 33 or 34 (constructed as a machine frame), by means of a support bolt 29 or 30 pivotally engaging support tabs 31 or 32 on the support 33 or 34; each said support 33 or 34 bears one respective group of rotary rakes 35, 36 or 37, 38 in a rotatably journaled manner. Thus, support pivot 27 or 28 and respective support crossbar 18 or 19 define an arm protruding from the corresponding support 33 or 34.

The support bolts 29 and 30 secured to the respective support pivots 27 and 28 lie approximately parallel to their supports 33 and 34 bearing the rotary rakes 35, 36 or 37, 38 and can pivot the supports 33 and 34 relative to the support pivots 27 and 28, i.e. they can vary the inclination of the rotary axes 39 of the rotary rakes 35, 36 and 37, 38, as is shown in particular by FIG. 6, by means of a hand crank 40 or 41 by pivoting the support bolts 29 or 30 in the support tabs 31 or 32. Lever arms 42 are arranged on the support pivots 27 and 28 and further lever arms 43 are arranged on the support 33 or 34 of the rotary rakes 35, 36 and 37, 38. The hand cranks 40, 41 are arranged between the free ends of said lever arms for varying the inclination of the rotary axes 39 of the rotary rakes 35, 36 and 37, 38. It is necessary to incline the upper end of the rotary axes 39 to a position 39′ in the direction of travel F of the machine for the working operation "tedding" in which the tedding forks are not "controlled" as hereafter discussed.

As is also shown in FIG. 1, the rotary rakes 35, 36 and 37, 38 of the machine are driven by the tractor power take-off shaft (not shown) via a main gearbox 44 which is mounted on the main support frame 7 and which has at its rear side two/drive shaft ends 45, 46 which drive the gears within the rotary rake gearboxes 49 and 50 via drive shafts 47, 48, which are changeable in length telescopically.

Figure 4:
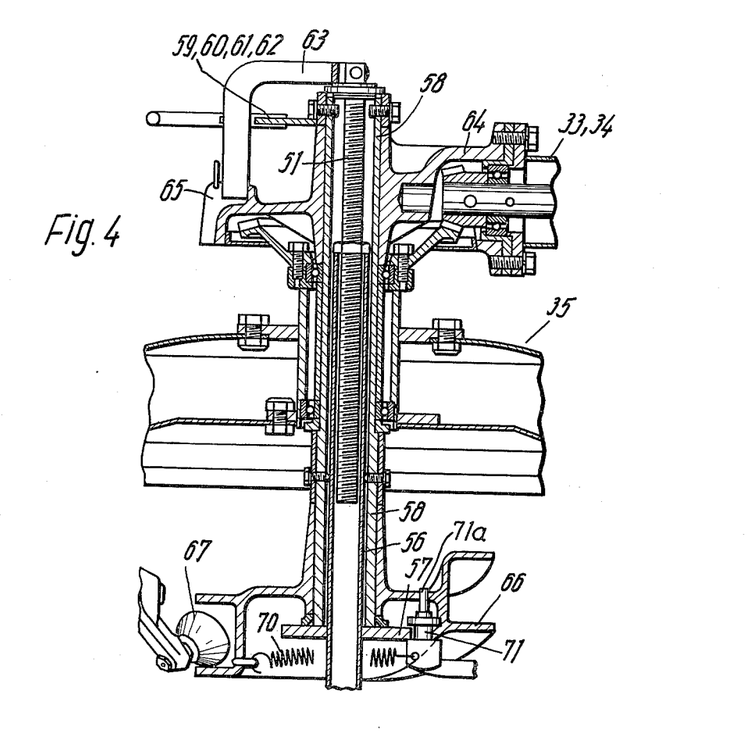

Below the rotary rakes 35, 36 and 37, 38, there are wheels 52, 53 and 54, 55 (FIGS. 8–10) provided which support the rotary rakes on the ground and which can be adjusted in height by an adjustment spindle 51 (FIG. 4). The wheels 52 and 55 of the two outer rotary rakes 35 and 38 are designed as wheels which determine the direction of travel while the wheels 53 and 54 of the inner rotary rakes 36 and 37 can have a positive caster so as to follow the respective directions of movement of the machine. However, basically it is possible to construct the wheels 53, 54 also as wheels which determine the direction.

To set the direction of travel of the wheels 52 and 55 of the rotary rakes 35 and 38, the lower end of each adjustment spindle 51 (FIG. 4) passing through the rotary rakes 30 and 33 is constructed as a square tube 56, which extends through and engages a square hole in an adjusting plate 57. The adjusting plate 57 is coupled through an adjusting tube 58 which circumferentially grips the adjusting spindle 51. The adjusting tube 58 connects at its upper end with a corresponding one of locking segments 59, 60 and 61, 62 disposed above the rotary rakes 35–38 as can be seen, in particular, from FIG. 3 and 4. Each locking segment 59, 60, 61, 62 can be set in the required travel direction position of its respective wheel 52, 53, 54, 55 relative to the support 33 or 34. A corresponding locking notch 65 on said support is engageable by an adjustment crank 63 which is pivoted on and rotatable with the upper end of the height adjustment spindle 51 for each of the wheels 52, 53, 54, 55. The locking notches 65 provided on the support 33 or 34 fulfill a double function in coaction with the pivotable adjustment crank 63, namely preventing the adjustment crank 63 and adjustment spindle 51 from unintended rotation and, secondly, the locking segment 59, 60, 61, 62 for the wheel direction adjustment of the wheels 52, 53, 54, 55 is secured in its respective position against rotation by means of the adjustment crank 63.

Figure 3:
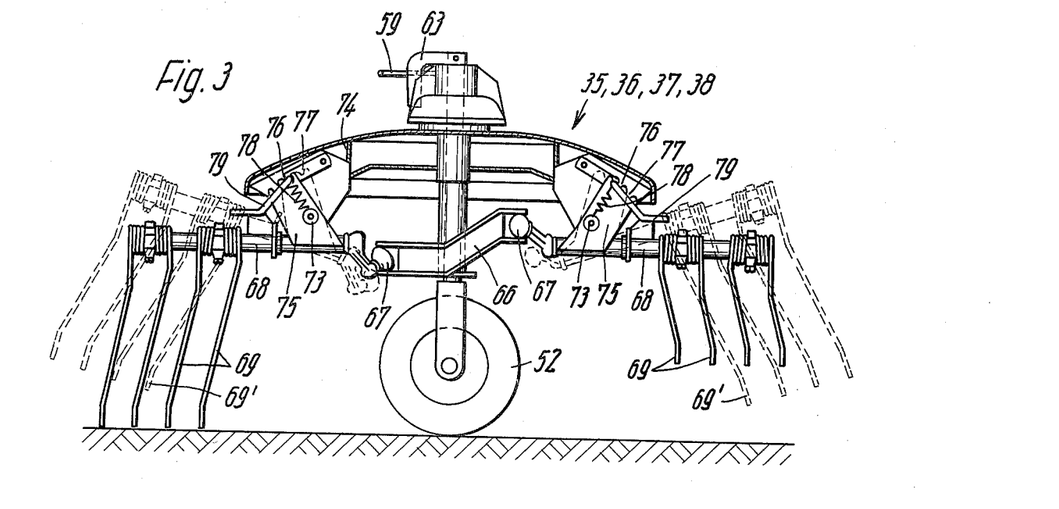
Figure 12:
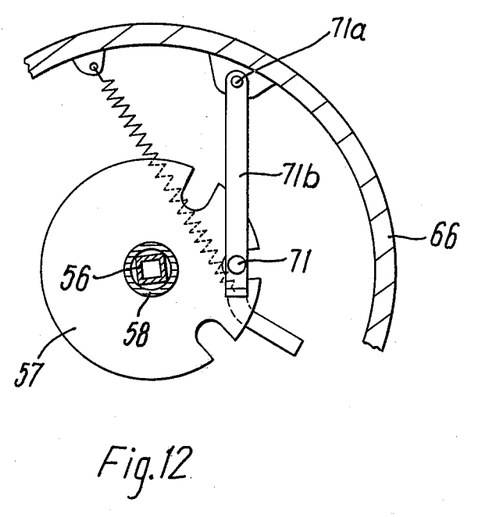
FIG. 12 is a schematic plan view of the adjusting plate 75 and the locking arrangement for the cam track 66.

As is particularly shown by FIGS. 3 and 4, together with the above mentioned adjustments the wheels 52, 53, 54, 55, there is also provided an adjustment for a cam track 66 for each of the rotary rakes 35, 36 and 37, 38. The cam track 66 is provided for controlling the angle (and hence height) of the teeth, tines or forks 69 (FIG. 3) of each rotary rake and is engaged by cam rollers 67 radially offset on the inner ends of circumferentially pivotable rake arms 68 carrying the sets of teeth 69. The cam track 66 is circumferentially fixed with respect to the adjusting plate 57 and thus with respect to the adjusting tube 58 by means of a locking bolt 71 (FIG. 4) which is held in locking position by a tension spring 70. As shown in FIG. 12, the locking bolt 71 is arranged on a rod 71b which is pivotably mounted on an axle 71a which is fixed to the cam track 66. However, for certain operations, a circumferential pivoting of the cam track 66 with respect to the adjusting plate 57 is also possible after unlocking the locking bolt 71.

The caster wheels 53 and 54 arranged below the inner rotary rakes 36 and 37 have axles which are fixed to cranks which are pivotably mounted on a caster pivot. The caster pivot is arranged on the free end of a cantilever arm which extends in the direction of travel and which is connected on its other end to the square tube 56. In the case when the working position of the machine is to be changed, it is advantageous that by turning the locking segments 60 and 61 not only the cam track 66 is pivoted, but also the square tube 56 including the cantilever arm with the caster pivot. By pivoting the square tube of the caster wheels 53 and 54, the freely pivotal caster pivots thereof are caused to attain positive caster so that the point of support of the wheels on the ground lies respectively along the extension of the axis of rotation of the rotary rakes. Such positive caster of the caster pivot of the caster wheels 53 and 54 prevents tilting and torsion torques from occuring due to the supporting forces.

FIG. 1 shows the hay-making machine 1 in its normal position in which it turns the material 72 to be treated either by means of "controlled" forks 69 (i.e. the forks 69 under control of cam track 66 as shown in solid lines in FIG. 3), or as it is shown in broken lines in FIG. 3, "teds" the material 72 by means of such forks but in their "non-controlled" condition shown at 69'. The "non-controlled" forks 69' thus are out of disengagement with the cam track during the work operation "tedding" and are secured to the rotary frame 74 of the corresponding rotary rake. The cam rollers 67 for the control of the teeth 69 are thereby uncoupled from their cam track 66 by pivoting their arms 68 about pins 73 secured on the rotary frame 74 of the corresponding rotary rake. The arms 68 are thereby supported swingably through bearing tongues 75 on the pins 73 and the bearing tongues 75 have locking recesses 76, 77, into which engage locking levers 79 each supported swingably on the rotary frame 74 against the force of a spring 78. In addition to these fixed positions of the forks 69, it is also necessary to incline the upper ends of the rotary axes 39 of the rotary rakes 35, 36 and 37, 38 toward the front in the direction of travel F as is explained above as to FIG. 6.

In the case of the two aforecited work cycles, the material to be treated is pulled from front to back by an inner rotary rake 36 or 37 and an outer rotary rake 35 or 38 through an area between these rakes and is then deposited behind the rakes after having been turned or tedded.

FIG. 8 shows in a schematic diagram one setting of the hay-making machine 1 illustrated in FIG. 1 which permits two smaller single swaths 80, 81 to be formed by the rakes. An inner rotary rake 36 or 37 and an outer rotary rake 35 or 38 are respectively spaced at a distance corresponding to the width of the swath by telescopingly extending the two sleeves 82, 83 or 84, 85 of the support 33 or 34 of the rotary rakes 35, 36 or 37, 38 as illustrated in FIG. 1. These relatively small swaths 80 and 81 normally serve as drying swaths, but can also be used as loading swaths in the case of very thick feed.

Figure 9:
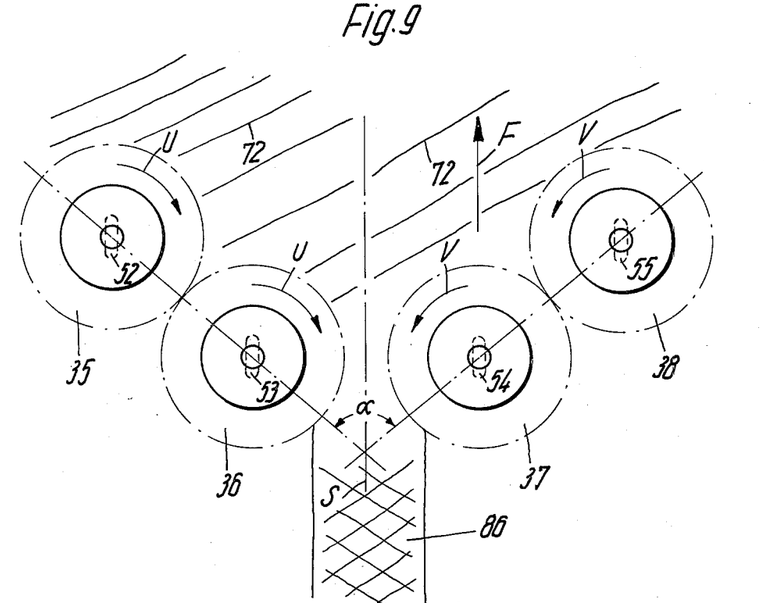
FIG. 9 is a schematic plan view of the position of the rotary rakes in the machine in accordance with FIG. 1, with the rotary rakes aligned in the shape of a V.

One working setting of the hay-making machine 1, with which a raking together of a large loading swath 86 is possible, is shown in FIG. 9. The two groups of rotary rakes 35, 36 and 37, 38 are pivoted about the support bearings 15 and 16 as can be seen in FIG. 1 and are locked in the V-shaped position with respect to the main support frame 7 as shown in FIG. 9. In this position, the straight lines established by the support frames 33, 34 form an angle $\alpha$ which points in the direction opposite the direction of travel F of the machine and whose apex lies approximately on the line of symmetry S extending in the direction of travel.

The rotary rakes in each group 35, 36 or 37, 38 have thereby in FIG. 9 the same directions of rotation U or V, namely the directions of rotation of the two inner rotary rakes 36, 37 must be reversed from the directions in FIGS. 1 and 8. This reversal of the direction of rotation is achieved by means of the rotary rake gearing 49 or 50, one of which is illustrated more in detail in FIG. 7. Telescoping shafts 88, which each drive the corresponding outer rotary rakes 35 and 38 are driven through bevel gears 89 and 90 by the driven drive shaft stub 87 (coupled to corresponding shaft 47 or 48). The drive shafts 91, which each lead to the corresponding inner rotary rakes 34 and 35 can, however, be driven rotatingly to the right and also rotatingly to the left. A clutch sleeve 93 is rotatably fixed on the drive shaft 91 but is longitudinally movable on the drive shaft 91. Clutch pins 92 of the clutch sleeve 93 are engageable either with associated recesses 94 of the bevel gear 90 or recesses 95 of a bevel gear 96 which is supported freely rotatably on the drive shaft 91 but is in engagement with the bevel gear 89. The clutch sleeve 93 is longitudinally movable by a shifting pin 99 which engages a groove 97 in the clutch sleeve 93 and is eccentrically secured on an indexing bolt 98. The indexing bolt 98 in turn can be switched over by means of a hand lever 100.

Figure 10:
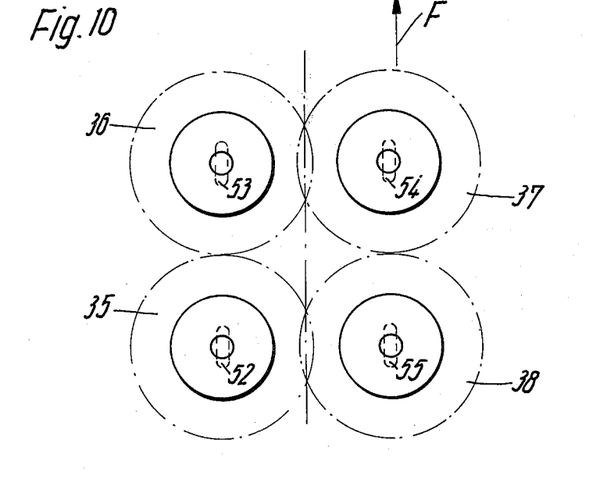
FIG. 10 is a schematic plan view of the position of the rotary rakes in the machine in accordance with FIG. 1, with the rotary rakes pivoted into the position for transport.

Readjusting the machine to the transport position shown in FIG. 10 is also carried out when the machine is raised slightly. The drive shafts 47 and 48, which connect the main gearbox 44 with the rotary rake gearboxes 49 and 50 and which are indicated in FIG. 1, are detached from the rotary rake gearboxes 49 and 50 before the rakes are pivoted into the transport position. This is done to enable the rotary rakes 35, 36 and 37, 38 to be pivoted into the transport position, in which the inner rotary rakes 36 and 37 and the outer rotary rakes 35 and 38 lie in direct proximity and mesh in part. The inner rotary rakes 36 and 37 are then located in this transport position in front of the outer rotary rakes 35 and 38 as seen in the direction of travel F of the machine. Pitching movements of the groups of rotary rakes 35, 36 or 37, 38 with respect to the main support frame 7 can be absorbed by the support pivots 27 and 28, since the latter extend transversely to the direction of travel F in the transport position of the machine and are rotatably journaled in the pivot bearings 20 or 21, as discussed above with respect to FIG. 1.

Figure 11:
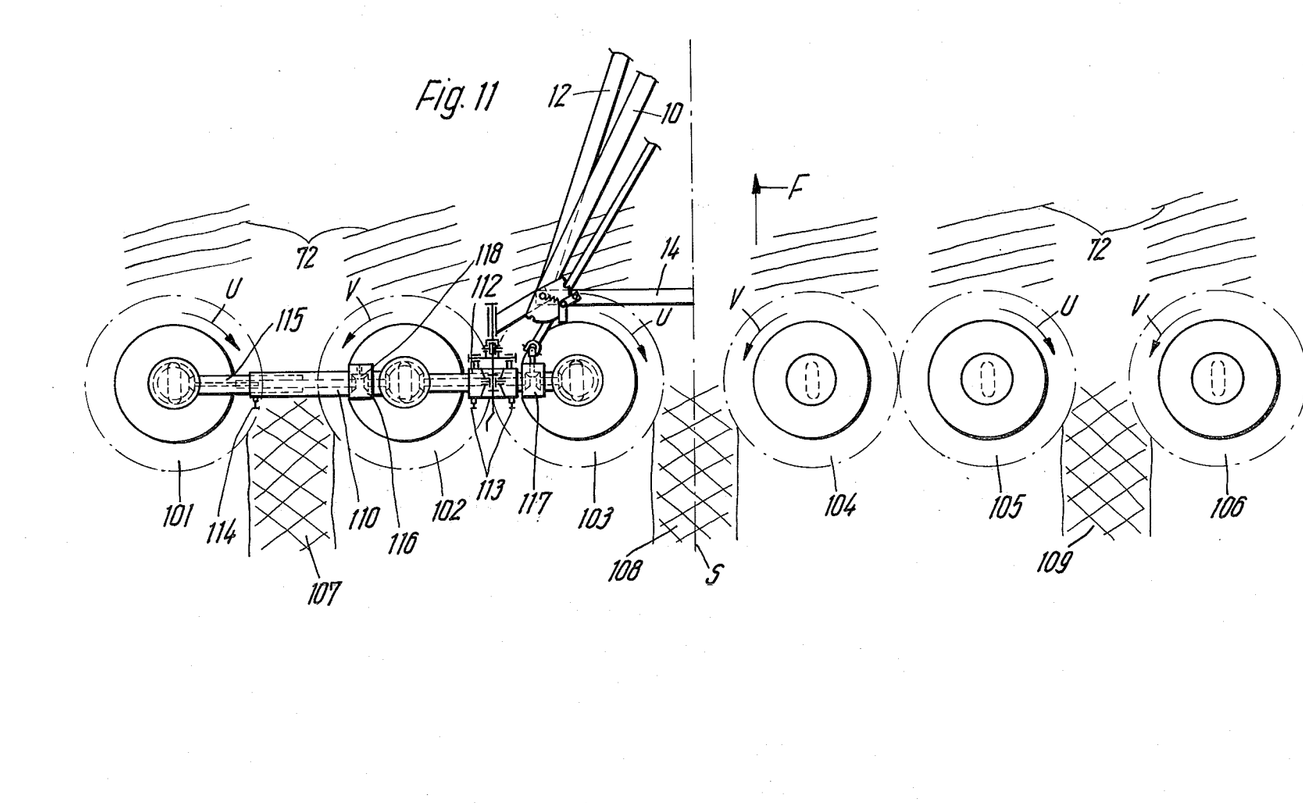
FIG. 11 is a schematic plan view of the position of the rotary rakes in embodiment in which three rotary rakes are provided for each respective group of rotary rakes.

As is illustrated by FIG. 11, there (instead of two) rotary rakes 101, 102, 103 or 104, 105, 106 can be provided in each group of rotary rakes, thereby permitting an even larger working width to be achieved. In addition to these work cycles already explained in the preceding figures, and which can be accomplished with the machine having a total of four rotary rakes, the machine of FIG. 11 can also form three small single swaths 107, 108, 109, which can then serve as drying or loading swaths. The rotary rake groups containing three rotary rakes each can, as this is illustrated in the left half of FIG. 11, be pivoted in the same manner as explained for the machine having two rotary rakes per respective group.

The rake groups 101–103 and 104–106 each have a common carrier, one such common carrier being shown at 110 on the left side of FIG. 11. The change of the separation of the rotary rakes 101, 102, 103 (and by similar means not shown for rakes 104, 105, 106) through a lateral shifting of the carrier 110 in a support part 112. The support part 112 is constructed as a part gripping around the carrier 110 and has clamping screws 113 for securing the carrier 110 in its intended axial position. The change of the separation of the rotary rake 101 from the rotary rake 102 is done by moving a support part 115, which is telescopically movable in the carrier 110 and can be secured by means of a clamping screw 114. Reversal of the direction of rotation, as required for various individual operations, is achieved by means of the gearings 116 and 117, which are constructed substantially like the gearing 49 of FIG. 7. In the gearing 116, however, the central bevel gear 118 has only a reversing function. The schematically illustrated right-side machine half is similarly constructed and the above described machine adjustments are achieved in a similar manner.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hay-making machine attachable to a tractor and comprising a frame and rotary rakes secured to said frame of the machine, said rotary rakes being supported on the ground so as to be transportable and being drivingly rotatable about approximately vertical axes of rotation, said machine frame having a main support frame, said main support frame as seen from above having substantially the shape of an equilateral triangle, the base of said triangle lying transverse to the normal direction of travel of the machine and the apex of said triangle pointing in said direction of travel, a main gearbox driveable by the tractor, a linking device for attaching the machine to the tractor, said main gearbox and said linking device being arranged adjacent the apex of said triangle, support bearings each having an approximately vertical bearing axis and each being disposed at a respective one of the base angles of said triangle, auxiliary frames each supporting a group of rotary rakes, each said auxiliary frame being pivoted in a zone between the rotary rakes thereof on a respective one of said support bearings so as to be pivotable and lockable in position with respect to the main support frame.

2. A hay-making machine according to claim 1, wherein the forks of the rotary rakes are secured to the outer ends of arms which can be controllably pivoted in an arbitrary manner about their longitudinal axes by means of a control gearing during the rotation of the rotary rakes or can be disengaged from said control gearing and locked on the bogie of the rotary rakes.

3. A hay-making machine according to claim 1, wherein each auxiliary frame comprises a common support which bears the rotary rakes and an arm protruding therefrom, said arm being pivoted on said support bearing of the main support frame.

4. A hay-making machine according to claim 3, wherein each support is individually journaled with respect to its arm so as to be pivotable and lockable about a pivot axis which is approximately parallel to the longitudinal axis of said support.

5. A hay-making machine according to claim 3, wherein said arm is composed of two parts which are articulately interconnected in a joint with an articulated axle which lies approximately parallel to the ground and at right angles to the support.

6. A hay-making machine according to claim 1, wherein the groups of rotary rakes can be brought into at least two different working positions as well as into a transport position by pivoting said supports about said support bearings and can be locked into these positions with respect to the main support frame.

7. A hay-making machine according to claim 1, wherein three respective rotary rakes are provided on each group of rotary rakes.

8. A hay-making machine according to claim 7, wherein the distance between the outer rotary rake and the inner rotary rake can be set by pivoting the outer rotary rake outwardly with respect to the inner rotary rake to a distance corresponding to a swath width.

9. A hay-making machine according to claim 8, wherein the distances between the two inner rotary rakes and between the outer rotary rakes and the center rotary rakes can be set to a distance corresponding to a swath width.

10. A hay-making machine according to claim 1, wherein one pair of rotary rakes is provided at each group of rotary rakes.

11. A hay-making machine according to claim 1, wherein said auxiliary frames each comprise a support which bears the rotary rakes and a support crossbar normally located forwardly thereof and pivotable about the corresponding one of said support bearings on said main support frame to bring the two groups of rotary rakes into a working position in which, as seen from above, straight lines respectively drawn through the longitudinal axes of said supports form an angle which points in a direction opposite said direction of travel of the machine and whose apex lies along the plane of symmetry extending in said direction of travel, the inner rotary rakes in said working position having a spacing from one another which is greater than the spacing of rotary rakes within each group of rotary rakes.

12. A hay-making machine according to claim 11, wherein the two groups of rotary rakes can be brought from working positions thereof into a transport position by pivoting said support crossbars thereof about said support bearings on said main support frame, said transport position as seen from above being one in which the inner rotary rakes are in direct transverse proximity and lie in the area in front of the outer rotary rakes which are also disposed in direct transverse proximity.

13. A hay-making machine according to claim 12, wherein, in said transport position, circles defined by the tips of the forks of the proximate rotary rakes partly overlap one another transversely of the normal working direction of travel of the machine.

14. A hay-making machine according to claim 1, wherein the main support frame is, in the lowered working position of the machine, journaled on a three-point attachment block attachable to the tractor and laterally pivotable about a pivot pin having an approximately vertical pivot axis.

15. A hay-making machine according to claim 14, including two wheels which have respective axes interalignable in every pivoting position of the machine and are pivotable about approximately vertical axes and are lockable in running positions corresponding to the respective pivoting positions of the groups of rotary rakes.

16. A hay-making machine according to claim 15, including adjustment means arranged above the rotary rakes and passing through the axes of rotation of the rotary rakes for setting the direction of running of the wheels.

17. A hay-making machine attachable to a tractor and comprising a main support frame substantially shaped as an equilateral triangle, the base of said triangle lying transverse to the normal direction of travel of the machine, the apex of said triangle pointing in said direction of travel, a linking device for attaching the machine to the tractor for pulling and disposed adjacent said apex, a pair of support bearings each having a substantially vertical bearing axis, said support bearings being respectively disposed at the base angles of said triangle, support crossbars pivoted on respective ones of said support bearings and means for locking said support crossbars at any of several angular positions circumferentially of said axes, said positions including a first normal working position and a second swath position and a transport position, supports each carrying a group of rotary rakes, arm means defining a pair of substantially orthogonal and substantially horizontal pivot axes for securing each said support, in the zone between the rotary rakes thereof, to the free end of the respective support crossbar, said orthoganal axes extending substantially parallel to and transverse to the axis of the corresponding support and said arm means displacing said zone of said support rearwardly and transversely outwardly from said approximately vertical axis in said first working position.

18. A hay-making machine according to claim 17, in which said locking means in its first working position locates said supports in transverse and substantially coaxial alignment, in its second working position disposes said supports in rearwardly convergent angular relation with the inner ones of said rotary rakes spaced further from each other than in said first working position for permitting said groups of rakes to form collectively a single swath centrally of said machine, and in its transport position pivotally displaces said support crossbars as seen from above through greater than a right angle from their second working position, said supports in said transport position being aligned parallel with the normal direction of travel of said machine and with said inner rotary rakes radially overlapped and with said outer rotary rakes also radially overlapped, whereby said groups of rotary rakes are shiftable through and into all of said positions with respect to said tractor merely by pivotal movement on said vertical axis support bearings and without linear support length change or changing the connection of said machine to said tractor.

* * * * *